United States Patent [19]

Antonio

[11] Patent Number: 5,097,757
[45] Date of Patent: Mar. 24, 1992

[54] MACHINE FOR EXTRACTING JUICE FROM CITRUS FRUIT, PARTICULARLY ORANGES

[76] Inventor: Cimenti Antonio, Via Baron, 15 - 30027 San Dona 'di Piave, Venezia, Italy

[21] Appl. No.: 599,394
[22] Filed: Oct. 19, 1990

[30] Foreign Application Priority Data

Oct. 19, 1989 [IT] Italy ............... 45784 A/89

[51] Int. Cl.$^5$ .......... A23N 1/02; A47J 19/02; B30B 9/02
[52] U.S. Cl. .................... 99/510; 99/495; 100/98 R; 100/125; 100/131; 221/251; 221/258
[58] Field of Search ............ 99/495, 509, 510, 513, 99/349; 100/98 R, 125, 131, 134, 135, 233, 264, 266, 218; 221/258, 251, 174, 168, 170

[56] References Cited

U.S. PATENT DOCUMENTS

| | | | |
|---|---|---|---|
| 1,575,704 | 3/1926 | Nayda | 100/131 |
| 2,067,555 | 1/1937 | Walker | 100/125 |
| 2,454,256 | 11/1948 | Myers | 100/98 R |
| 2,479,194 | 8/1949 | Eastman | 100/131 |
| 2,667,118 | 1/1954 | Nelson | 99/495 |
| 3,086,455 | 4/1963 | Belk | 100/131 |
| 3,776,128 | 12/1973 | Morris | 100/233 X |
| 4,088,070 | 5/1978 | Montagroni et al. | 99/509 |
| 4,154,163 | 5/1979 | Niemann | 99/495 |
| 4,309,944 | 1/1982 | Frost, Jr. et al. | 99/509 |
| 4,917,007 | 4/1990 | Nelson | 99/509 |
| 4,922,814 | 5/1990 | Anderson et al. | 99/510 |

FOREIGN PATENT DOCUMENTS 2216784 10/1989 United Kingdom ............... 99/495

Primary Examiner—Timothy F. Simone
Attorney, Agent, or Firm—Wenderoth, Lind & Ponack

[57] ABSTRACT

A machine for extracting juice from citrus fruit, in particular oranges, includes an inclined chute conveying the fruits to be squeezed against a step, a spoon that raises the fruit resting on the step, and two squeezing plates below the step. The plates include a front plate and a back plate, the front plate being pivoted at its upper part and urged by a spring toward the back plate. The back plate is connected to a connecting rod and crank driven by a speed reducer by which the back plate is slid longitudinally horizontally toward and away from the front plate. As the two plates converge, the fruit interposed therebetween is squeezed by the back plate. Juice thus extracted from the fruit drips into an underlying hopper and from there is collected in a container. Afterwards, as the back plate moves away from the front plate, the residue of the previously squeezed fuit falls down on an inclined grill disposed over the hopper and is collected in a collecting drawer.

14 Claims, 7 Drawing Sheets

MACHINE FOR EXTRACTING JUICE FROM CITRUS FRUIT, PARTICULARLY ORANGES

BACKGROUND OF THE INVENTION

The present invention relates to a very simple and easy-to-use machine for extracting juice from citrus fruit, particularly oranges.

Various ways for extracting juice from citrus fruit are known. These include the simple manual steps of cutting the fruit and then squeezing the two halves thereof by hand, and the use of very simple manual devices such as the well-known "citrus fruit-squeezers," as well as the use of more complicated machines which perform the fruit-squeezing operation in a more or less automatic manner.

For instance, a machine is known which crushes between two plates a citrus fruit previously cut in half. Besides requiring the fruit to have been cut, such machine requires both the loading of the fruit and the extraction of the residue therefrom to be performed manually; practically speaking it replaces in a complicated way the simple manually operated citrus fruit-squeezer provided with a lever.

Besides, due to the tendency for the holes provided on its lower horizontal plate, on which the two halves of the fruit to be squeezed are placed, to become obstructed, such machine cannot be easily cleaned.

Other per se known machines comprise systems for automatically loading, cutting and subsequently squeezing the fruit.

These machines for feeding, cutting, squeezing and evacuating the residue are considerably elaborate and complicated; moreover, the cleaning of the operating members normally isn't easy and is inadequate.

The range of sizes of the fruits which can be squeezed is normally limited and, finally, the overall size of such machines is always considerable.

SUMMARY OF THE INVENTION

The object of the present invention is to obviate the above-indicated drawbacks and restrictions of the prior art. This object is achieved by the machine of the present invention, which machine is compact and comprises: feeding and squeezing members for feeding and squeezing the fruit, means for driving said feeding and squeezing members, adapted to actuate them cyclically in a coordinated way, and collecting means for collecting the residue of the fruit after being squeezed, which members and means are all very simple and reliable and which machine permits fruits of considerably different sizes to be squeezed in very rapid cycles and, finally, to facilitate the complete cleaning of the members coming in contact with the fruit and with the juice therefrom.

Such machine comprises a conveyor provided with a feeding element for feeding a piece of fruit at the beginning of each cycle of the machine to a squeezing unit, the squeezing unit for stopping, positioning and squeezing the fruit as well as for discharging the residue thereof, suitable conveyor for forwarding the residue toward a suitable collecting element, collecting and conveying means for conveying and collecting the juice produced during the squeezing of the fruit. The machine is characterized in that said conveyor is constituted by an adequately inclined chute at the lower end of which a stop element is situated, which is constituted by a step; said feeding element is arranged near said lower end and is constituted by a spoon adapted to lift the fruit disposed thereon over said step; the squeezing unit includes a front plate pivoted at its upper side and biased by suitable resilient means toward an inclined position, a horizontally slidable back plate guided by adequate guiding means for movement toward and away from said front plate by an associated driving unit. The driving unit also operates said spoon at the beginning of each cycle. The front and about plates initially converge toward each other such that a piece of fruit admitted therebetween stops while being positioned therebetween. The back plate is moved toward the front plate until the front plate is arranged vertically parallel to the back plate, whereby the juice is squeezed from the fruit. This juice drops onto the collecting and conveying means constituted by an adequate hopper, discharge conduit and suitable container. Subsequently said back plate is moved away from said front plate finally causing the discharge of the residue of the squeezed fruit, which residue falls on the conveyor in the form of a grill inclined above said hopper. The residue slides on the grill into the collecting element in the form of a drawer of the machine.

BRIEF DESCRIPTION OF THE DRAWINGS

The features and advantages of the present invention will be better understood hereinafter by the detailed description of a preferred embodiment thereof, made solely by way of a not limitative example with reference to the accompanying drawings, wherein.

DETAILED DESCRIPTION OF THE PREFERRED EMBODIMENT

Figure 1:
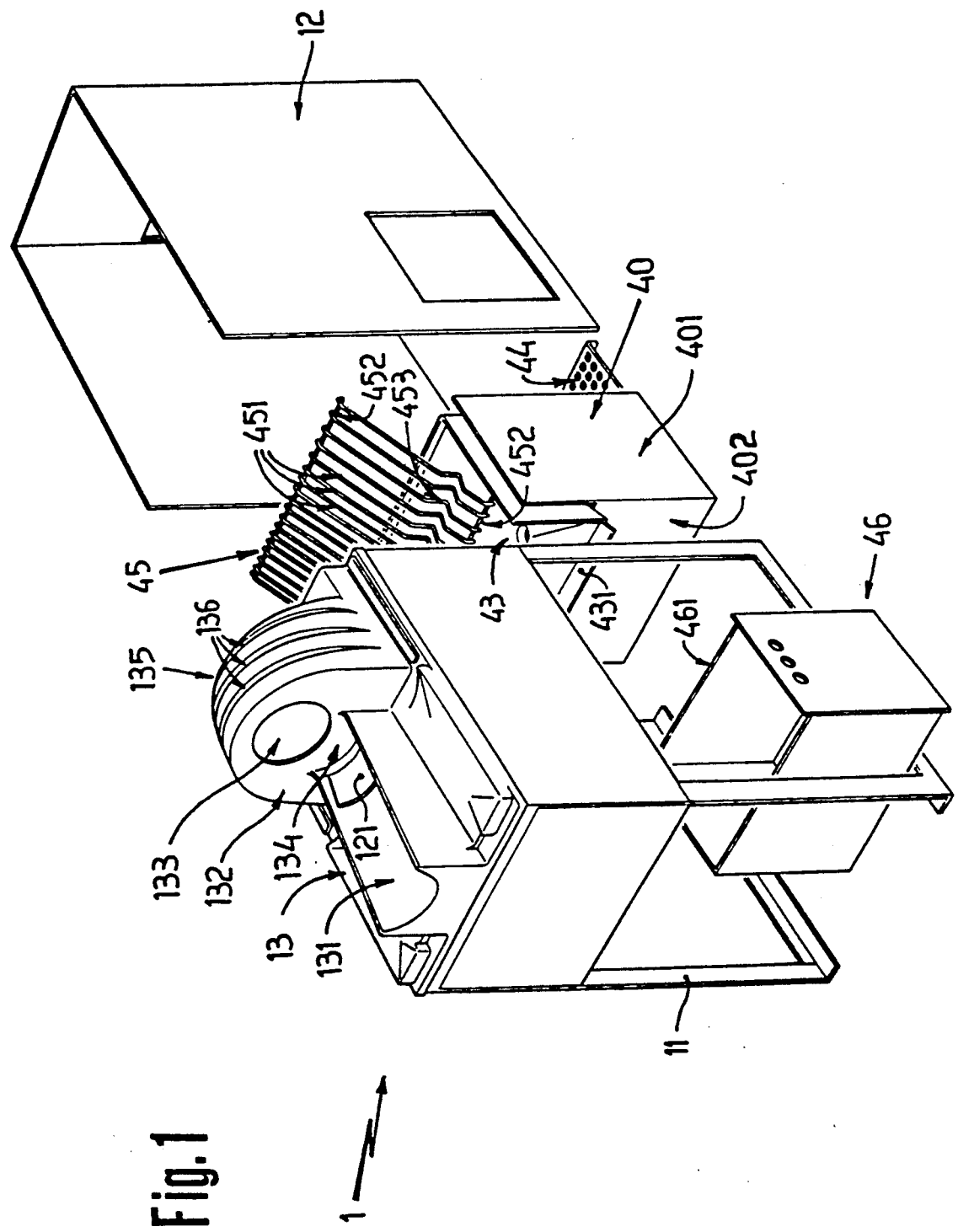
FIG. 1 is an exploded perspective view of the machine according to the present invention.

With reference to such figures in which the common items are marked with the same reference numerals, the machine 1 according to the present invention comprises a framework 11 which can be made of suitable metallic sections. A perimetrical casing 12 is fitted to framework 11 so as to define an envelope of a substantially parallel-epipedal shape. The upper part of the framework is covered by a cover 13, which cover is so shaped as to provide a chute 131 constituted by a cavity substantially in the form of an upset bent tile, extending centrally of the framework from a back end toward a front end thereof with a downwards inclination.

The front end of said chute 131 terminates against a vertical wall 132 provided centrally with a hole 133 having a diameter fairly greater than the largest diameter of the fruits which one desires to squeeze in the machine. The edge of the wall defining the lower part of hole 133 is located fairly above the bottom of the chute 131, so as to practically form a step 134.

Moreover, said vertical wall 132 extends towards the front part of the machine with an arcuate cap 135 which terminates at the level of the front edge of said cover 13 and is provided with transverse ribs 136, whose function will be described later.

Further, a rectangular hole is provided at the front end of the chute 131 and a spoon 121 is accommodated therein, which spoon is constituted by a correspondingly shaped rectangular element so bent as to follow the same shape of the chute 131.

Such spoon 121 is connected to the front end of a bar 38 which has a fulcrum at its back end formed by a stud 381, adequately connected to the framework 11 of the machine 1. The bar 38 engages the circumferential portion of a disc 33 provided with a projection 331 adapted to operate the bar 38 as described later.

The members of the fruit squeezing unit 2 and the members of the associated driving unit 3 are arranged on the underlying side of the cover 13.

The members of the squeezing unit 2 are constituted by a front plate 21 pivoted at its upper end on the framework 11 by a stud 211, which can be easily extracted therefrom, and by a vertically extending back plate 22. The back plate 22 is horizontally slidable along associated horizontal guide members 23, which are in turn connected to the framework 11.

Said front plate 21 is also urged by a spring 212, so that at the rest position thereof, namely when the machine does not operate and the back plate 22 is positioned toward the back of the machine, the front plate 21 is inclined toward the back of the machine with its lower end disposed near said back plate 22 but spaced some centimeters therefrom or, rather, by a distance fairly less than the smallest size (diameter) of the fruits to be squeezed.

The front plate 21 is simply constituted by a plate of suitable plastic material and has a sufficient thickness while, as seen in FIGS. 2, 3, 4, 5 and 6, the back plate 22 is constituted by a first plate 221 made of suitable plastic material having a sufficient thickness, and a second metallic support plate 222. The first plate 221 is inserted in the height-wise direction between the support plate 222 and adequate fixing elements 223, constituted by angle sections disposed on the sides and on the bottom of said support plate 222.

Clearly, such an arrangement permits said plate 221 to be easily mounted to or removed from the machine as much as one likes.

Also the front plate 21 may be easily removed from the machine and remounted thereto simply by extracting therefrom or re-inserting therein said stud 211.

The members of the driving unit 3 comprise a geared motor constituted by an electric motor 31 and a mechanical speed-reducer 32. A disc 33 is fitted to the shaft 321 of the geared motor. The disc is provided at its peripheral edge, as previously described, with the projection 331 as well as with an eccentric pin 34 engaging an end of a connecting rod 35. The other end of the connecting rod 35 engages a stud 36 of a unit 37 connected to the back plate 2.

Such connecting unit 37 is constituted by a plate 371 pivoted at its upper end to lugs 372 extending from the rear face of said metallic support plate 222. On the other hand, the lower end of plate 371 engages a spring 373 interposed between said plate 371 and the rear face of said metallic support plate 222.

Moreover, a fork 374 is provided between the two ends of said plate 371, to which fork the corresponding front end of the connecting rod 35 is connected by said stud 36. The connecting unit 37 dampens the movement of said back plate 22, particularly when the same is moved to the front end position, by facilitating movement of the back plate 22 over the dead point thereof, so as to inhibit the strains caused by the squeezing of the fruit which may otherwise cause an undesired locking of the machine.

An envelope 40 of a substantially parallelepipedal form is situated below both the front plate 21 and the back plate 22. The side walls 401 of envelope 40 extend from the lower edges of said front plate 21 and back plate 22 to the lower end of the machine. The front face of envelope 40 is open, while the back face thereof is closed at its lower portion by a wall 402, extending about half the height of the side walls 401. A hopper 53 formed by a casing having the shape of an irregular pyramid with a rectangular base is disposed within the envelope 40. At the upper part thereof, the side edges of such casing engage the inner part of the side walls 401 of said envelope 40, while the front edge thereof is aligned with the upper end of said envelope 40 and the rear edge thereof rests with a lip 431 on the upper edge of the back wall 402 of said envelope 40. Said hopper 43 may be easily engaged with an disengaged from the envelope 40 and, when inserted therein, is inclined with the lip 431 of its back edge on the upper edge of the back wall 402 and with its front portion on the upper end of the envelope 40 via adequate hooking elements (not shown).

Moreover, on the upper part of said hopper 43 is disposed a grill 45 which is constituted, as clearly shown in FIG. 1, by a plurality of metallic rods 451 disposed parallel to the sides of said hopper 43 and interconnected at their two ends by respective transverse rods 452. Said metallic rods 451 have "V" shaped bent portions 453 near their rear ends whose vertices are directed toward the lower portion of the machine.

Further, at the lower end of the envelope 40 is disposed, in a portion thereof shaped as a reservoir, a support shelf 44 made of a stainless steel perforated sheet, whose edges are folded downwards so as to be easily insertable therein and extractable therefrom. A container 47 may be placed on the shelf 44 near the outlet pipe 432 of the hopper 43, and in which container is collected the liquid obtained by squeezing the fruit in the machine 1. Finally, a collecting drawer 46 is located to the rear of the envelope 40. The upper side edge 461 of the drawer 46 is arranged below the lip 431 projecting from the back of the hopper 43. As already explained, the first plate 221 of the back plate 22 and the front plate 21 may be easily removed from and remounted to the machine, which facilitates the efficient washing thereof. Thus, the plates can be completely and safely cleaned.

The cover 13, the envelope 40, the hopper 43, the grill 45 and the support shelf 44 may also be easily removed from and remounted to the machine, so that these parts may also be efficiently cleaned.

Thus, it is clear that all of the parts of the machine which come in contact with the fruit during its squeezing and/or with the juice dripping or splashing therefrom, may be carefully and easily cleaned so as to ensure the greatest hygienics of the machine.

The operation of the machine will now be described with particularly reference to FIGS. 3, 4, 5 and 6.

Figure 3:
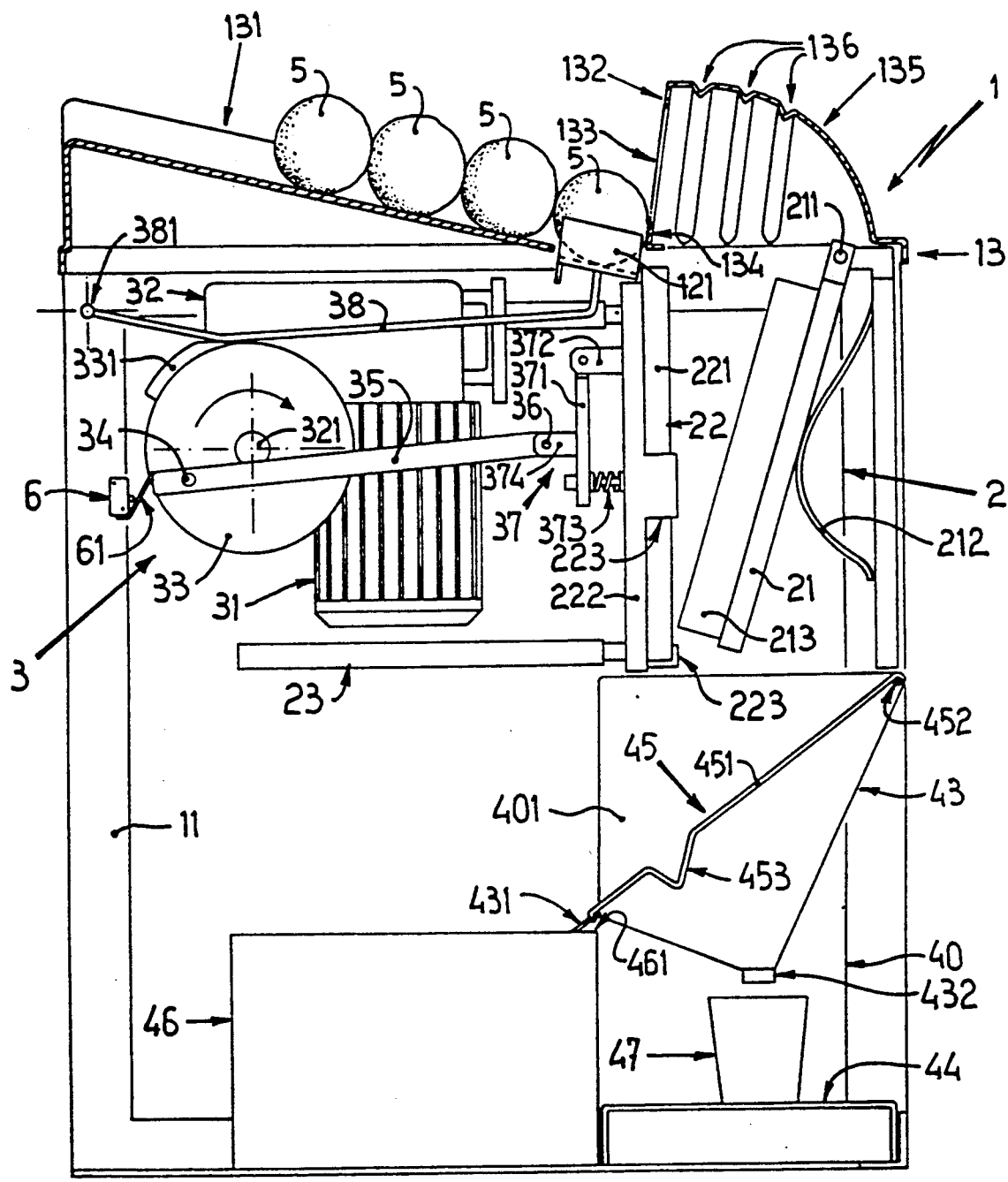
FIGS. 3, 4, 5 and 6 are broken-away side views of the machine showing the main operative steps carried out by the machine.

In FIG. 3, the machine 1 is illustrated at the initial state thereof in which it is still and ready to start a squeezing cycle.

As clearly pointed out from such FIG. 3, in this state the pin 34 is positioned, with respect to the direction of rotation of the disc 33 indicated by the arrow thereabove, slightly before the back dead point of the relevant driving unit 3, and the projection 331 is situated at a rest position below said bar 38, with the bar resting on its inclined front portion forming the cam surface of the same.

The operator will have adequately disposed in advance a number of pieces of fruit 5 on the chute 131, which fruit due to the inclination of said chute 13 will slide thereon, until the first piece abuts the step 134, which thus stops the sliding of the fruit.

The fruit 5 abutting said step 134 is also positioned above the spoon 121.

At this point, the operator by pushing an adequate control push-button (not shown) arranged preferably on the front panel of the machine 1, connects a voltage supply with the electric motor 31, thereby causing the disc 33 to rotate through the speed reducer 32 in the direction indicated by the arrow.

Consequently, the projection 331 pushes the bar 38 upwards, so that the spoon 121 disposed at its free end shifts the fruit 5 positioned thereon upwards above the step 134. The fruit 5 is then pushed forward by the other fruit, enters the cap 135 through the hole 133 and falls down into the squeezing unit 2.

Figure 4:
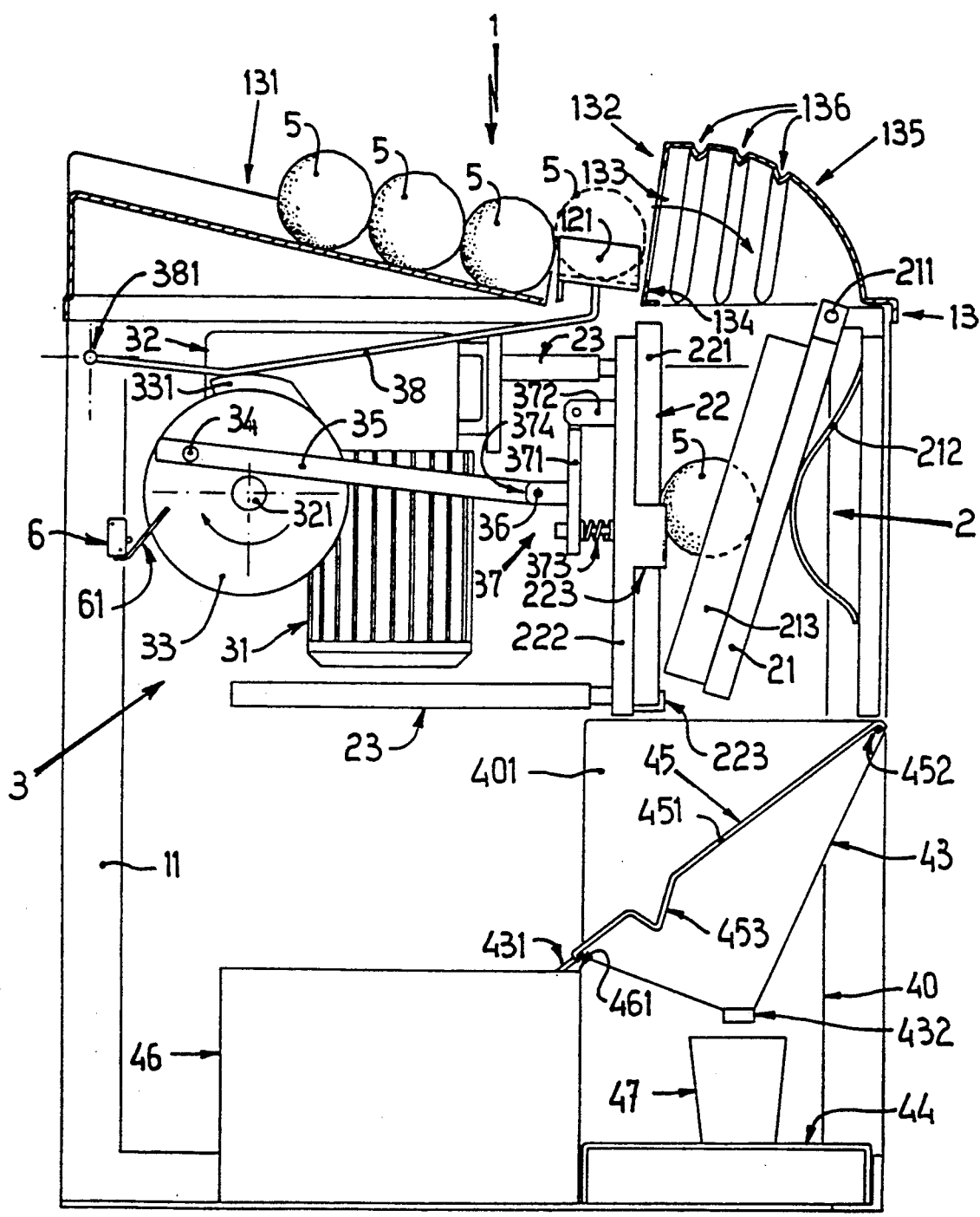

Due to the inclination of the front plate 21, by which its lower edge is spaced from the back plate 22 by a distance which is less than the diameter of the same fruit 5, the fruit 5 is positioned between the two plates 21-22 as clearly shown in FIG. 4.

Although in this first step the back plate 22 slides horizontally by a small amount, this amount of sliding is practically negligible.

With the further rotation of the disc 33, the projection 331 leaves the bar 38 so that the latter comes in contact again with the circumferential edge of said disc 33 and the associated spoon 121 returns to its initial position.

The remaining pieces of fruit 5, thus, slide along the chute 131 and the now first fruit 5 positions itself on the spoon 121. At the same time, the back plate 22 slides longitudinally forward and pushes the fruit 5, which as explained above is interposed between this plate 22 and the front plate 21, against the latter. Thus, plate 21 rotates about the stud 211 and stops itself in a vertical position against a stopping element (not shown).

Figure 5:
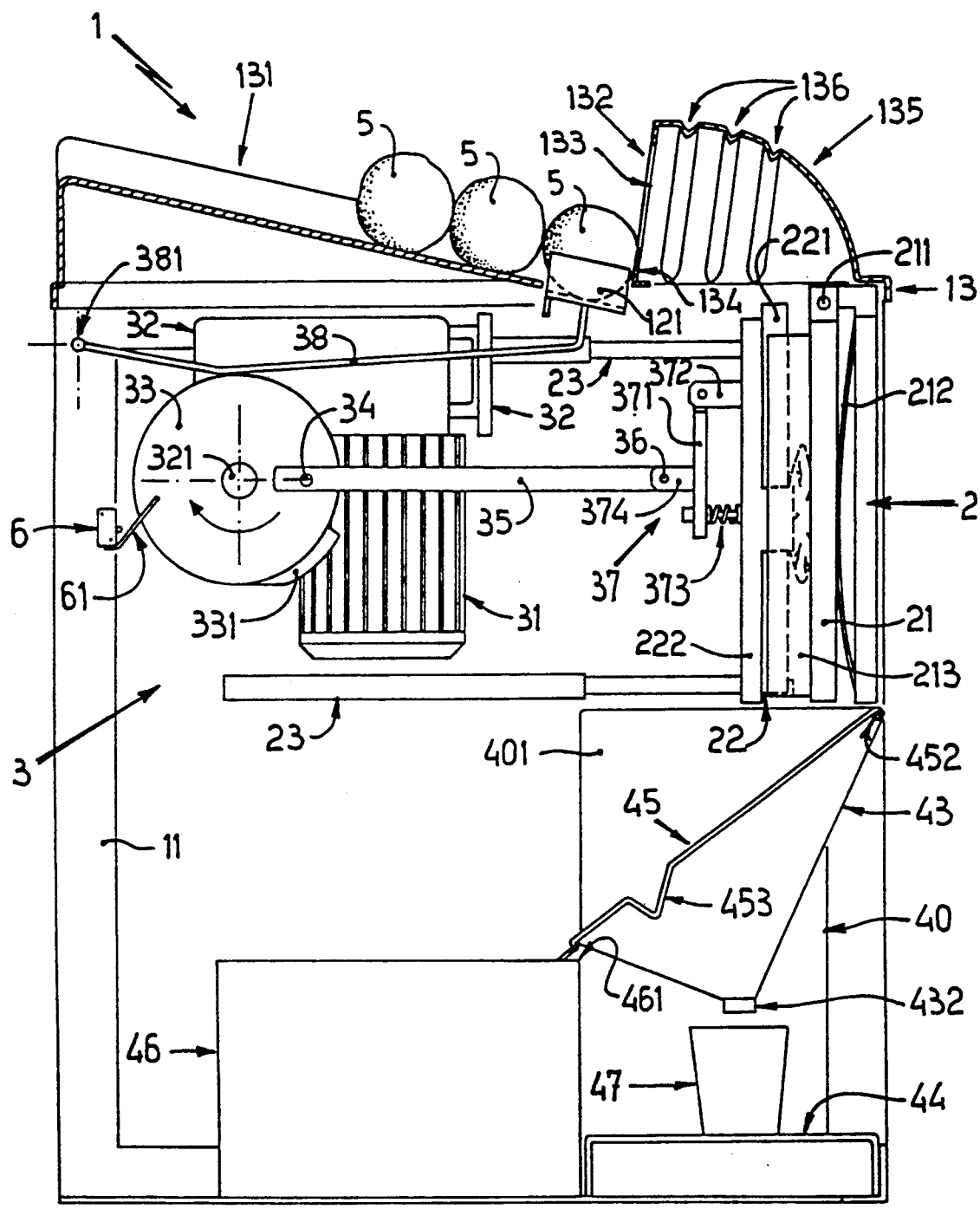
Figure 6:
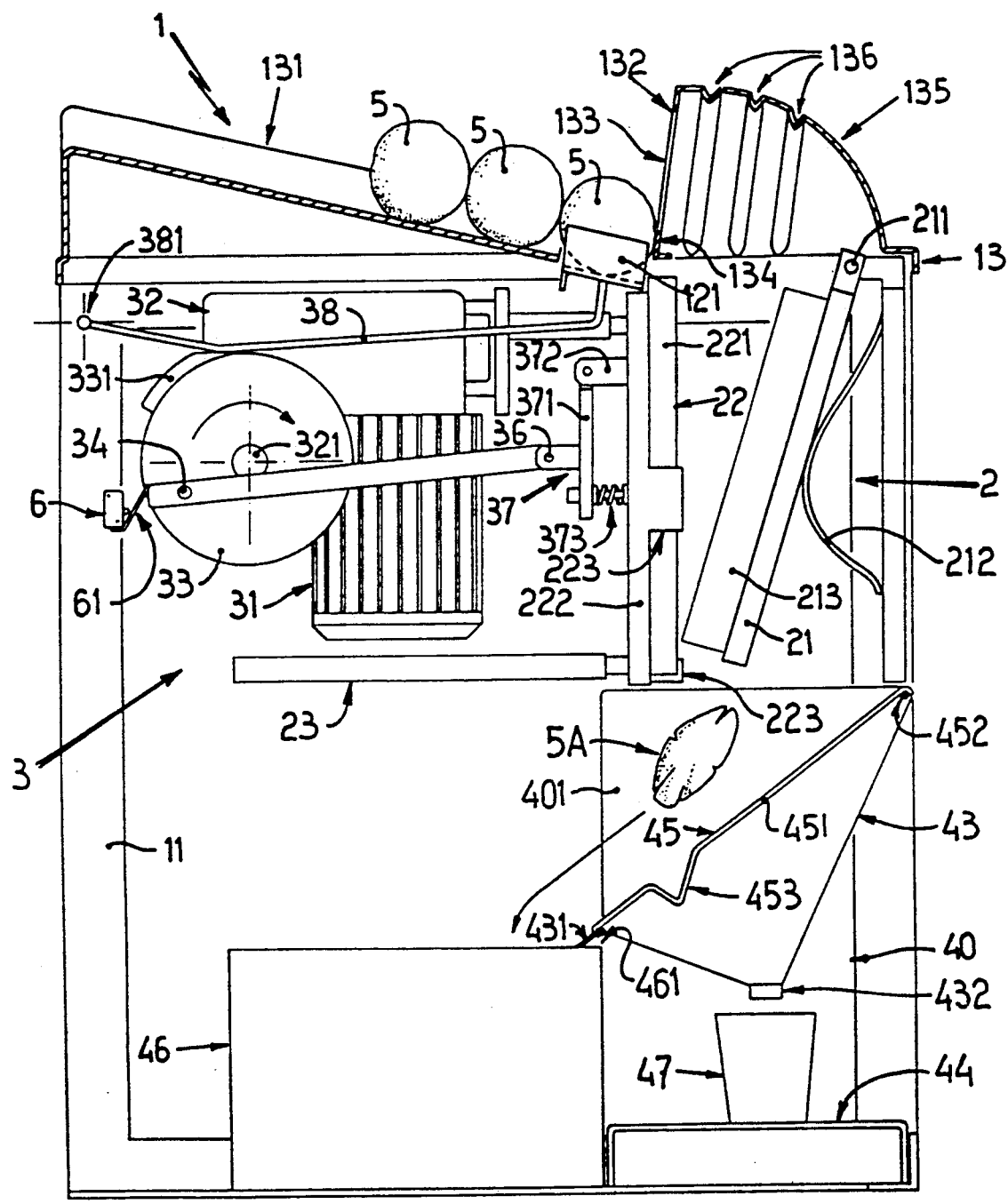
Figure 8:
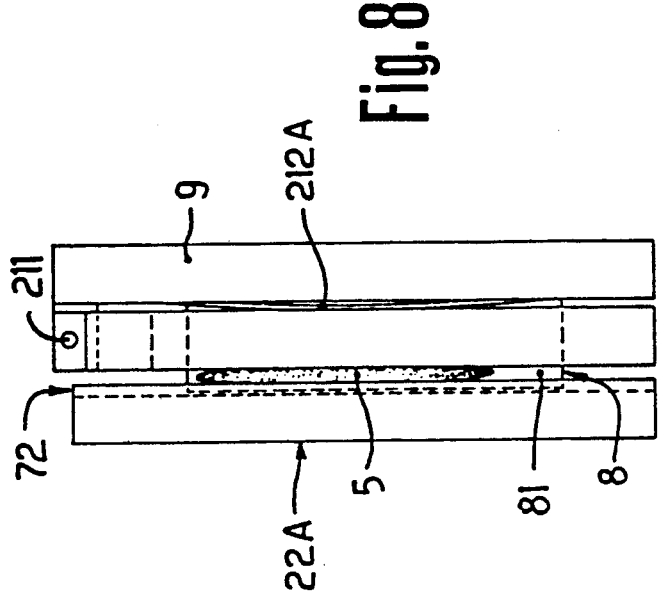
FIGS. 7 and 8 are a side view and a front view, respectively, of a modified form of part of the machine, as such part performs the equivalent steps illustrated in FIGS. 3 and 5.
Figure 10:
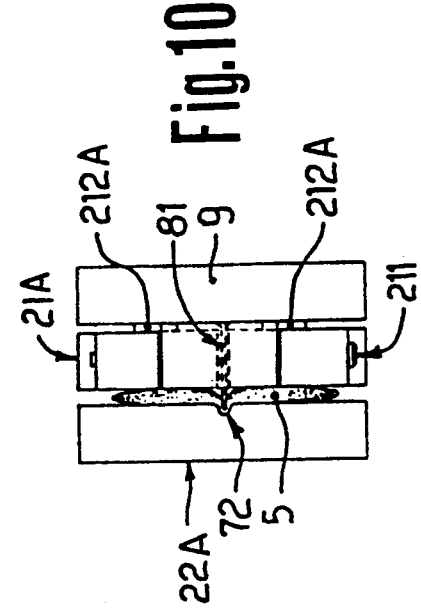
FIGS. 9 and 10 are plan views respectively of FIGS. 7 and 8.

The back plate 22 advances until the pin 34 is positioned at the front dead point and in such position, clearly illustrated by FIG. 5, this plate is disposed with its front face near the rear face of the front plate 21, being separated by a few millimeters therefrom, which space is equivalent to the thickness formed by the peel of the fruit 5 (orange or the like). Clearly, the progressive advancing of the back plate 22 provides a corresponding progressive squeezing of the fruit 5, which firstly causes the actual explosion thereof with a consequent breakage of its peel. Then, with the fruit 5 being so open, its juice falls down into the underlying hopper 43, passing through the openings of the grill 45 and from here, through the relevant outlet pipe 432, and into the container 47 (made of glass or the like) disposed beneath such outlet pipe 432.

As the squeezing step is finished, the rotation of the disc 33 continues so that the back plate 22 is moved toward the back of the machine, thus being progressively removed from the front plate 21. And, as soon as the two plates (21-22) are separated by a sufficient amount, the residue of the squeezed fruit (that is the peel together with the seeds and the rest of the squeezed peel), which is indicated by reference numeral 5A in FIG. 6, breaks off therefrom and falls down on the grill 45 on which it slides, due to the sufficient inclination thereof, finally falling into the collecting drawer 46.

It is to be noted that the liquid part (juice) of the fruit, by falling on the metallic rods 451 of the grill 45, would also slide therealong so as to possibly drip into the drawer 46 instead of into the hopper 43. On the contrary, this is avoided by the bent portions 453 which are provided, as explained above, near the lower back ends of said metallic rods 451. These bent portions 453 cause the juice to drip into the hopper 43.

The rotation of the disk 33 continues until the end of the connecting rod 35 pivoted on the pin 34 bears against the control level 61 of the microswitch 6, which switches off the electric motor 6 and therefore stops the cycle.

At this point, as clearly shown in FIG. 6, the machine is again in the position illustrated in FIG. 3 and, thus, is ready to perform a further cycle which obviously will be the same as that described above.

Figure 2:
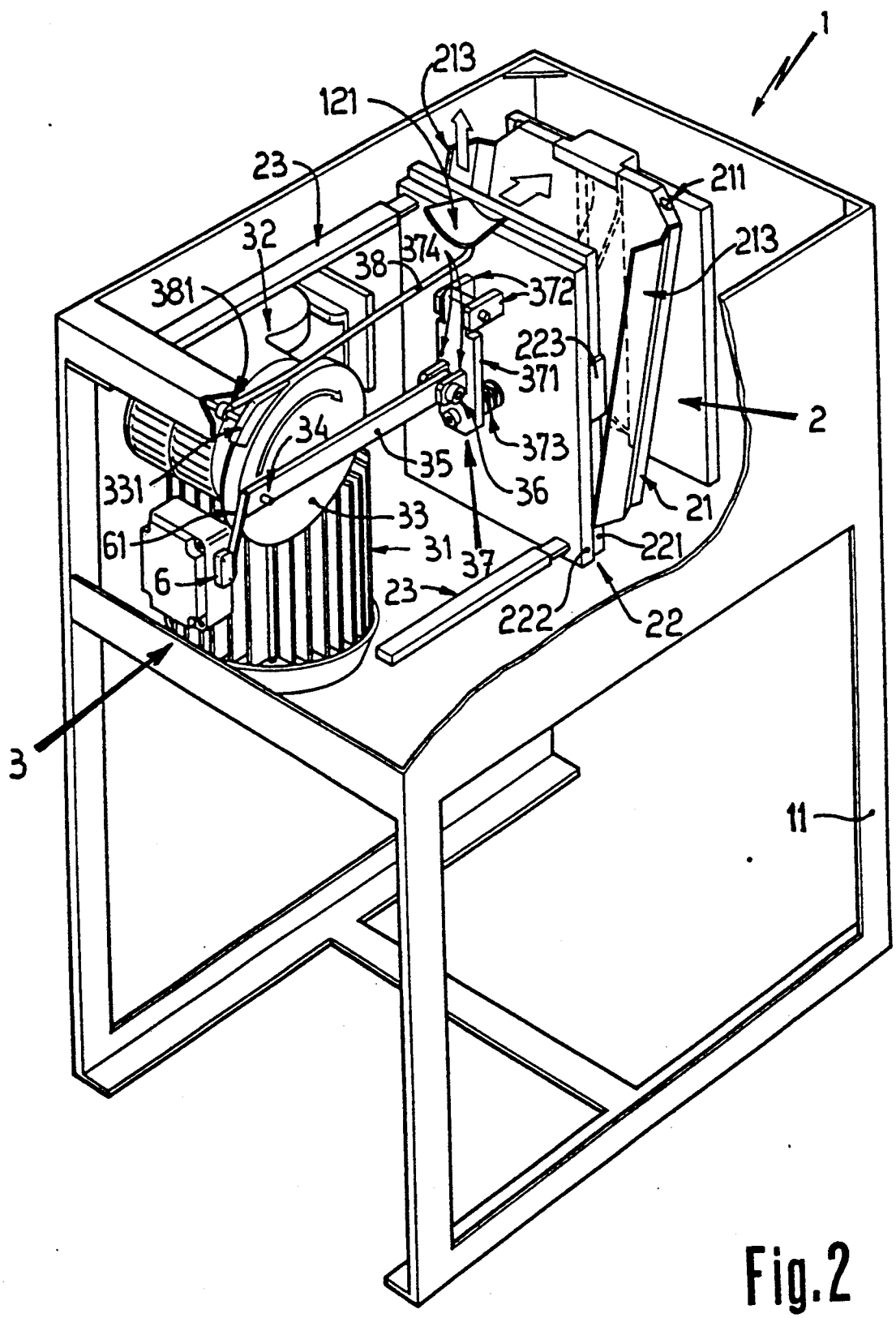
FIG. 2 is a partially broken-away perspective view of the same machine, particularly showing the fruit squeezing members and the associated driving means.

At this point, it is to be noted that the front plate 21 is provided with two sides baffles 123 constituted, as is particularly clear from FIG. 2, by two rectangular plates fitted on the sides of said front plate 21 and projected toward the opposite back plate 22, whose function is to stop the juice or other substances obtained during the squeezing step of the fruit from splashing out the side of the machine. The function of the transverse ribs 136 provided on the cap 135 is similar, in fact they serve to collect and convey at their ends the liquid splashed on the inner surface of the cap 135, due to the explosion of the fruit which, as explained above is caused during the squeezing step thereof. That is, the liquid drips from the ends of said ribs 136 into the underlying hopper 43.

Obviously, the machine can be operated to perform one or more cycles and, accordingly, to squeeze only one or more pieces of fruit. Moreover, it may be provided with a container for collecting and storing the juice obtained by squeezing a number of fruits, which squeezing is effected by operating the machine over a suitable number of successive cycles.

Obviously, such container is provided with adequate drawing means and in any case, may also be provided with cooling means and/or means for stirring the liquid contained therein, which means are all of a per se known kind.

Finally, the cover 13 may be so shaped as to hold a larger number of fruits to be squeezed than that positionable on the chute 131.

A second embodiment will now be described with particular reference to FIGS. 7, 8, 9 and 10.

This embodiment basically concerns the fruit squeezing unit 2 and, more precisely, the use of a system for cutting the fruit before squeezing the same.

In the above-mentioned FIGS. 7, 8, 9 and 10, the items already described in the first embodiment of the machine, but which are modified according to the second embodiment, namely the front plate, the back plate and the spring, are designated by the same reference numerals with the literal reference "A" added thereto. All of the other elements which are not modified are designated by the same reference numerals.

The front plate 21A has a cut-out 71, extending longitudinally and at the center thereof from its lower edge until near the upper edge thereof.

A blade 8 constituted by a rectangular metallic sheet 81 is disposed in correspondence with such a cut-out 71. The blade 8 has a front longitudinal edge 82 connected to the framework 11 of the machine, and a longitudinal back edge 83 which is adequately sharpened.

Moreover, two springs 212A are disposed laterally of the blade 8. A recess 72 extends longitudinally and centrally along the entire front face of the back plate 22A, and more precisely on the face opposite to the front plate 21 and the longitudinal back edge 83 of said blade 8.

The recess 72 extends a few millimeters into the back plate 22A and has a transverse section with rounded corners, adapted to facilitate the cleaning thereof as well as to prevent the squeezed fruit from being retained therein. The width of the cut-out 71 is slightly greater than the thickness of the blade 8, so that the blade 8 will freely enter the cut-out 71 with a very limited play.

Figure 9:
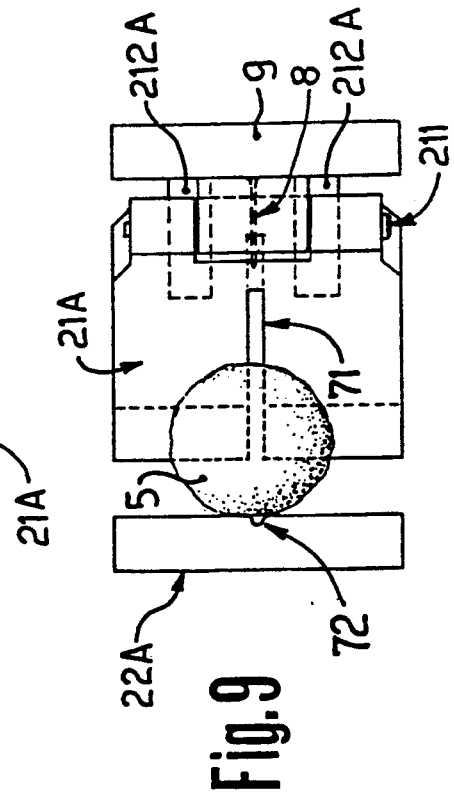

In addition, the front longitudinal edge 82 of the blade 8 is joined to the metallic plate 9 with adequate fillets so as to avoid sharp corners, thus facilitating the cleaning operation. At the initial step, that is before the start of a squeezing cycle, the front plate 21A and the back plate 21B are positioned, as illustrated in FIGS. 7 and 9, exactly as at the same positions of the initial step previously described and illustrated in FIG. 3.

Figure 7:
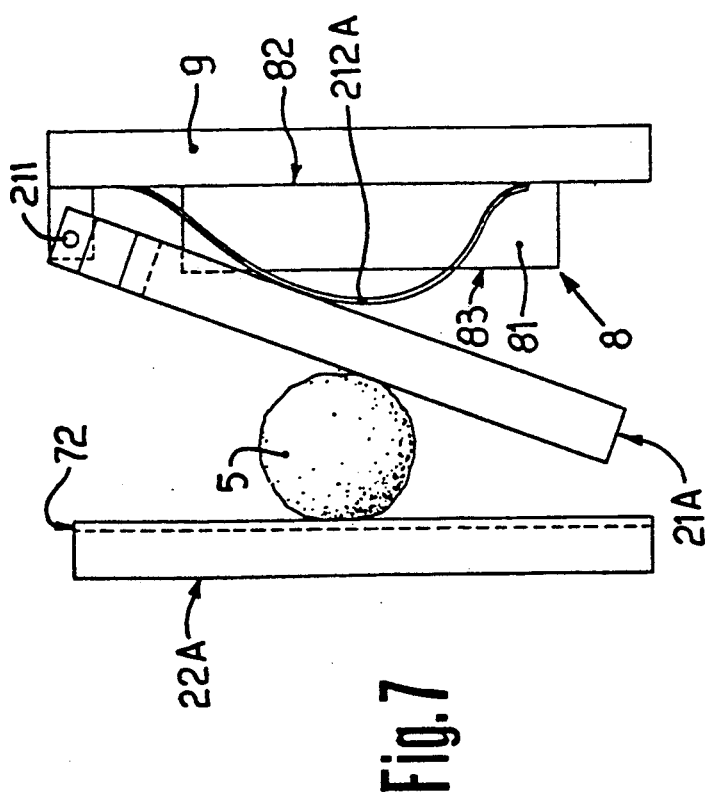

As clearly pointed out particularly from FIG. 7, the front plate 21A is pushed toward the back plate 22A by the two springs 212A, and in this position the blade 8 enters the cut-out 71 of the front plate 21A only at its upper part without projecting therefrom, so that the fruit 5 positioned between the two plates 21A and 21B will not be cut by the blade 8.

In the following step, when the back plate 22A is pushed toward the front plate 21A, the latter will be rotated around stud 211 so that the sharpened longitudinal edge 83 of the blade 8 will be progressively projected therefrom, thereby progressively entering the fruit 5 to cut it. At the end of such movement, as clearly pointed out from FIGS. 8 and 10, the front plate 21A is arranged vertically in opposition to the back plate 22A, being also spaced some millimeters therefrom.

In such a position, the sharpened longitudinal edge 83 of the blade 8 will project some millimeters from the front plate 21A, so as to be partially received in the recess 72 provided in the back plate 22A, whereby the fruit 5 will be cut in two.

In such a manner, the fruit 5 will be fairly cut before being crushed, thus preventing an explosion of the fruit and other inconveniences.

It will be evident that the particular features of the machine referred to above yield several advantages, which include:

a compact size by which the machine can be placed directly on a table or another support,
  considerably constructive and structural simplicity with consequent reduced production costs, making the machine economical from a commercial point of view,
  considerable quickness in performing an operative cycle,
  facilitating a complete cleaning of the parts coming into contact with the fruits to be squeezed, their residues after squeezing and the juice obtained therefrom, i.e. high hygienics,
  excellent squeezing of the fruit and providing excellent juices, which are anyhow of a quality equivalent to the juices obtained by the prior art machines,
  ability to squeeze a considerably wide dimensional range of fruits, that is fruits having considerably different sizes (diameters).

It is well understood that different variations and changes may be made to the machine of the present invention without departing from what is hereinafter claimed. Therefore, all such variations and changes are seen to fall within the true spirit and scope of the present industrial invention.

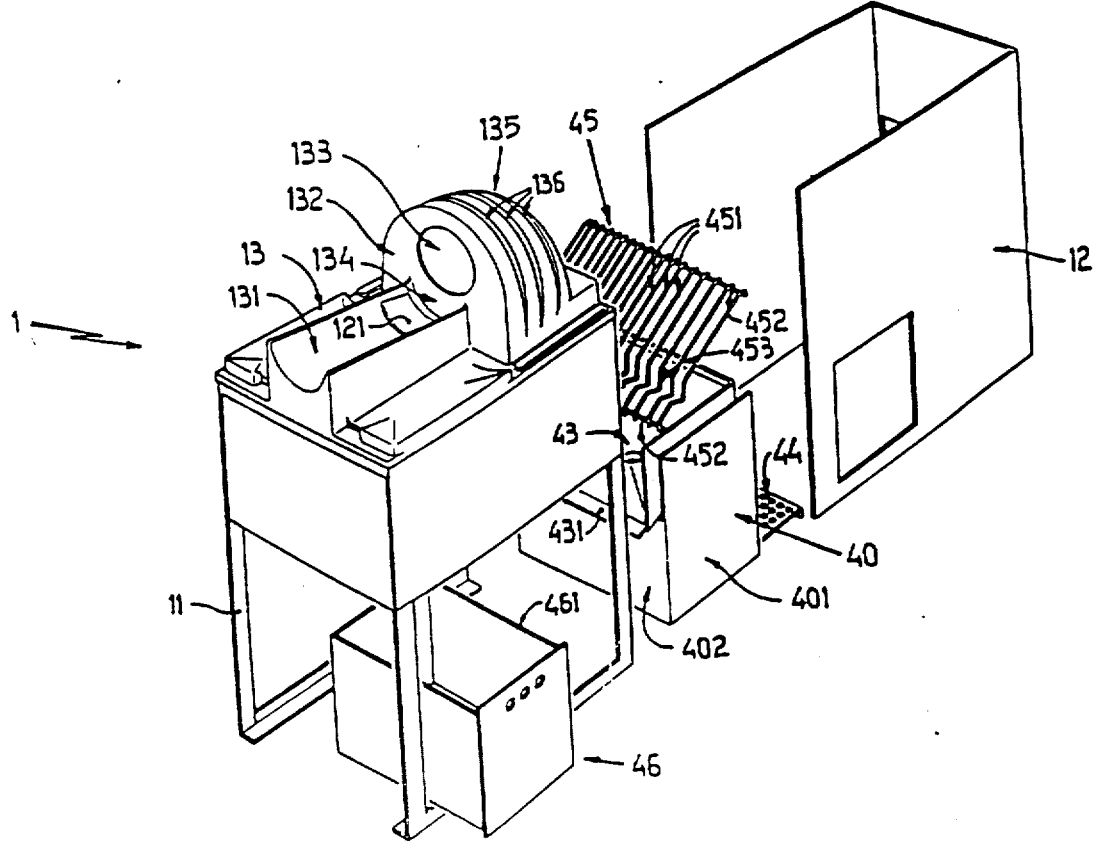

I claim:
1. A machine for extracting juice from fruit, said machine comprising:

a framework;
  a squeezing unit including a back plate extending vertically in the machine, a front plate confronting said back plate, connecting means for pivotably mounting said front plate to said framework at an upper end said front plate, resilient means for biasing said front plate about said upper end thereof toward an inclined initial position at which the front plate converges from the upper end thereof toward said back plate so as to define a fruit-accommodating space between said plates in which a piece of fruit to be squeezed will be received and positioned, and guiding means for guiding said back plate for movement in the machine in a horizontal direction toward and away from said front plate;
  an inclined chute of a size which will accommodate a number of pieces of fruit in a row;
  a cap disposed adjacent a lower end of said inclined chute, said cap defining a step disposed above said space between said plates whereby fruit loaded in said chute comes to rest against said step;
  a spoon-like element disposed at the bottom of said chute adjacent said step, said spoon-like element being vertically movable between a first position at which it will support a first piece of fruit abutting said step and a second position at which a piece of fruit supported thereon will be raised above said step;
  driving unit means operatively connected to said back plate and to said spoon-like element for raising said spoon-like element from said first position to said second position thereof to lift a piece of fruit supported thereon over said step and into said fruit-accommodating space, for moving said back plate in said horizontal direction toward said front plate when a piece of fruit is interposed therebetween in said space until said front plate is pivoted against the force exerted by said resilient means to a vertical position parallel to said back plate thereby squeezing juice from the fruit, and for subsequently moving said back plate in said horizontal direction away from said front plate to thereby return the front plate to the initial position thereof under the force exerted by said resilient means and release the residue of the fruit squeezed between said plates;
  a hopper disposed beneath said plates so as to receive the juice from a piece of fruit squeezed between said plates, said hopper having an outlet through which juice falling therein is to be discharged; and a grill disposed over said hopper so as to prevent the residue of a piece of fruit squeezed between said plates from falling into said hopper, said grill being inclined in the machine so as to direct the residue of a piece of fruit falling thereon away from said hopper.

2. A machine for extracting juice from fruit as claimed in claim 1, and further comprising a drawer disposed beneath a lower end of the grill so as to receive the residue directed by the grill away from said hopper.

3. A machine for extracting juice from fruit as claimed in claim 2, and further comprising a container disposed below the outlet of said hopper so as to receive the juice discharged from the hopper.

4. A machine for extracting juice from fruit as claimed in claim 1, wherein said front plate is of plastic, and said connecting means is a stud which is releasably securable to said framework so as to permit the removal of said front plate from the machine.

5. A machine for extracting juice from fruit as claimed in claim 1, wherein said back plate includes a first plate of plastic material, a second metallic plate, and fixing elements extending from said second metallic plate and releasably securing said first plate to said second plate.

6. A machine for extracting juice from fruit as claimed in claim 1, wherein said cap has an arcuate configuration and extends over said squeezing unit, said cap has a front wall defining a hole through the center thereof, said front wall extending substantially vertically at the bottom of said chute, said step being formed by a portion of said wall that defines the bottom of said hole, a lower edge of said front wall terminating adjacent an upper end of said back plate when said back plate is in its initial position in the machine, and said cap also terminating at a front end thereof adjacent the upper end of said front plate, and said cap has transverse ribs therein confronting said fruit-accommodating space so as to convey from the cap any juice splashed thereon from fruit being squeezed in the machine.

7. A machine for extracting juice from fruit as claimed in claim 1, wherein said driving unit means includes an electric motor, a speed reducer connected to said motor so as to transmit the output of said motor at a reduced rate, a disc connected to the speed reducer so as to be rotated thereby, a pin extending from said disc at a location spaced from a center of rotation of the disc, a connecting rod pivotably mounted at one end thereof to said disc through said pin, a connecting unit mounted to said back plate, and a stud pivotably connecting the other end of said connecting rod to said connecting unit, said connecting unit including dampening means for providing a resilient connection between said back plate and said connecting rod.

8. A machine for extracting juice from fruit as claimed in claim 1, wherein the inclined grill includes intercepting means adjacent a lower portion thereof for intercepting juice sliding down therealong and discharging the juice from the grill to said hopper.

9. A machine for extracting juice from fruit as claimed in claim 1, wherein said front plate has a cut-out extending through the center and longitudinally thereof, said back plate has a corresponding recess extending therein, and said squeezing unit includes a blade aligned with said cut-out and said recess, said blade projecting through said cut-out and into said recess when said front plate has been pivoted to the vertical position thereof by the movement of said back plate by said driving unit means.

10. A machine for extracting juice from fruit as claimed in claim 9, wherein said squeezing unit further includes a support plate removably connected to said framework, said blade being fixed to said support plate and having fillets extending therebetween.

11. A machine for extracting juice from fruit as claimed in claim 9, wherein said back plate has a smoothly curved surface defining the bottom of said recess.

12. A machine for extracting juice from fruit as claimed in claim 10, wherein said back plate has a smoothly curved surface defining the bottom of said recess.

13. A machine for extracting juice from fruit as claimed in claim 4, wherein said driving unit means includes an electric motor, a speed reducer connected to said motor so as to transmit the output of said motor at a reduced rate, a disc connected to the speed reducer so as to be rotated thereby, a pin extending from said disc at a location spaced from a center of rotation of the disc, a connecting rod pivotably mounted at one end thereof to said disc through said pin, a connecting unit mounted to said back plate, and a stud pivotably connecting the other end of said connecting rod to said connecting unit, said connecting unit including dampening means for providing a resilient connection between said back plate and said connecting rod.

14. A machine for extracting juice from fruit as claimed in claim 5, wherein said driving unit means includes an electric motor, a speed reducer connected to said motor so as to transmit the output of said motor at a reduced rate, a disc connected to the speed reducer so as to be rotated thereby, a pin extending from said disc at a location spaced from a center of rotation of the disc, a connecting rod pivotably mounted at one end thereof to said disc through said pin, a connecting unit mounted to said back plate, and a stud pivotably connecting the other end of said connecting rod to said connecting unit, said connecting unit including dampening means for providing a resilient connection between said back plate and said connecting rod.

* * * * *

UNITED STATES PATENT AND TRADEMARK OFFICE
CERTIFICATE OF CORRECTION

PATENT NO. : 5,097,757

DATED : March 24, 1992

INVENTOR(S) : Antonio Cimenti

It is certified that error appears in the above-identified patent and that said Letters Patent is hereby corrected as shown below:

Title page should be deleted to appear as per attached title page.

Signed and Sealed this

Twenty-ninth Day of December, 1992

Attest:

DOUGLAS B. COMER

*Attesting Officer*      *Acting Commissioner of Patents and Trademarks*

United States Patent [19]

Cimenti

[11] Patent Number: 5,097,757
[45] Date of Patent: Mar. 24, 1992

[54] MACHINE FOR EXTRACTING JUICE FROM CITRUS FRUIT, PARTICULARLY ORANGES

[76] Inventor: Antonio Cimenti, Via Baron, 15 - 30027 San Dona 'di Piave, Venezia, Italy

[21] Appl. No.: 599,394
[22] Filed: Oct. 19, 1990

[30] Foreign Application Priority Data

Oct. 19, 1989 [IT] Italy ............................ 45784 A/89

[51] Int. Cl.⁵ .................. A23N 1/02; A47J 19/02; B30B 9/02
[52] U.S. Cl. .................. 99/510; 99/495; 100/98 R; 100/125; 100/131; 221/251; 221/258
[58] Field of Search .................. 99/495, 509, 510, 513, 99/349; 100/98 R, 125, 131, 134, 135, 233, 264, 266, 218; 221/258, 251, 174, 168, 170

[56] References Cited

U.S. PATENT DOCUMENTS

| | | | |
|---|---|---|---|
| 1,575,704 | 3/1926 | Nayda | 100/131 |
| 2,067,555 | 1/1937 | Walker | 100/125 |
| 2,454,256 | 11/1948 | Myers | 100/98 R |
| 2,479,194 | 8/1949 | Eastman | 100/131 |
| 2,667,118 | 1/1954 | Nelson | 99/495 |
| 3,086,455 | 4/1963 | Belk | 100/131 |
| 3,776,128 | 12/1973 | Morris | 100/233 X |
| 4,088,070 | 5/1978 | Montagroni et al. | 99/509 |
| 4,154,163 | 5/1979 | Niemann | 99/495 |
| 4,309,944 | 1/1982 | Frost, Jr. et al. | 99/509 |
| 4,917,007 | 4/1990 | Nelson | 99/509 |
| 4,922,814 | 5/1990 | Anderson et al. | 99/510 |

FOREIGN PATENT DOCUMENTS

2216784 10/1989 United Kingdom ............... 99/495

Primary Examiner—Timothy F. Simone
Attorney, Agent, or Firm—Wenderoth, Lind & Ponack

[57] ABSTRACT

A machine for extracting juice from citrus fruit, in particular oranges, includes an inclined chute conveying the fruits to be squeezed against a step, a spoon that raises the fruit resting on the step, and two squeezing plates below the step. The plates include a front plate and a back plate, the front plate being pivoted at its upper part and urged by a spring toward the back plate. The back plate is connected to a connecting rod and crank driven by a speed reducer by which the back plate is slid longitudinally horizontally toward and away from the front plate. As the two plates converge, the fruit interposed therebetween is squeezed by the back plate. Juice thus extracted from the fruit drips into an underlying hopper and from there is collected in a container. Afterwards, as the back plate moves away from the front plate, the residue of the previously squeezed fuit falls down on an inclined grill disposed over the hopper and is collected in a collecting drawer.

14 Claims, 7 Drawing Sheets